(12) United States Patent
Blanchard

(10) Patent No.: US 7,665,589 B2
(45) Date of Patent: Feb. 23, 2010

(54) TRANSMISSION BOX FOR WHEELED MACHINE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 287 days.

(21) Appl. No.: 11/432,338

(22) Filed: May 12, 2006

(65) Prior Publication Data
US 2006/0289225 A1 Dec. 28, 2006

(30) Foreign Application Priority Data
May 13, 2005 (FR) .................................. 05 04853

(51) Int. Cl.
*F16D 41/00* (2006.01)
(52) U.S. Cl. .................. 192/46; 192/54.5; 192/93 A
(58) Field of Classification Search .................. 192/46, 192/50, 54.5, 69.81, 93 A; 56/11.8; 74/650
See application file for complete search history.

(56) References Cited

U.S. PATENT DOCUMENTS

| | | | | |
|---|---|---|---|---|
| 479,192 A * | 7/1892 | Leedle | ..................... | 192/46 |
| 1,597,198 A * | 8/1926 | Howell | ..................... | 192/69.81 |
| 2,554,346 A | 5/1951 | Ried | ..................... | 188/83 |
| 3,306,406 A * | 2/1967 | Poliseo | ..................... | 192/46 |
| 3,651,906 A * | 3/1972 | Slator et al. | ..................... | 192/35 |
| 4,153,964 A | 5/1979 | Klug | | |
| 4,204,293 A * | 5/1980 | Schlapman | ..................... | 15/79.1 |
| 4,213,521 A * | 7/1980 | Modersohn | ..................... | 192/18 R |
| 4,271,941 A * | 6/1981 | Miller | ..................... | 192/35 |
| 4,433,764 A * | 2/1984 | Goscenski, Jr. | ..................... | 192/18 R |
| 6,701,796 B2 * | 3/2004 | Blanchard | ..................... | 74/325 |
| 2003/0155204 A1 | 8/2003 | Demir et al. | | |
| 2004/0159517 A1 | 8/2004 | Thomas | | |
| 2006/0021313 A1 * | 2/2006 | Keane et al. | ..................... | 56/11.8 |

FOREIGN PATENT DOCUMENTS

| | | |
|---|---|---|
| EP | 0 782 820 | 7/1997 |
| EP | 1 198 981 | 4/2002 |
| GB | 17903 | 7/1914 |
| GB | 2130315 A * | 5/1984 |

* cited by examiner

*Primary Examiner*—Richard M. Lorence
(74) *Attorney, Agent, or Firm*—Young & Thompson

(57) ABSTRACT

A transmission box (3) for a wheeled machine having, within the box (3), a motor input shaft (4) driving a drive wheel to actuate at least one drive shaft of at least one wheel (2A, 2B) of the machine (1). A clutch mechanism is disposed between the drive wheel and the drive shaft of the wheels (2A, 2B) of the machine (1), this clutch mechanism being actuated by driving in rotation the drive wheel and axial movement of a member on the drive shaft of the wheels (2A, 2B) and deactuated by driving in rotation the drive shaft of the wheels (2A, 2B). The member which is axially movable in the drive shaft of the wheels carries ramps coacting with a member secured in rotation with the shaft.

10 Claims, 7 Drawing Sheets

TRANSMISSION BOX FOR WHEELED MACHINE

BACKGROUND OF THE INVENTION

The present invention relates to an improved transmission box for wheeled machine, particularly of the walking type, as well as a wheeled machine, particularly of the walking type, provided with such a transmission box.

It relates more particularly to wheeled machines whose transmission box is of the type comprising, disposed at least partially within said box, an input motor shaft driving a drive wheel to actuate at least one drive shaft of at least one machine wheel, a clutch mechanism being disposed between said drive wheel and the drive shaft of the machine wheels, this clutch mechanism being actuated by driving in rotation the drive wheel and axial movement of a member on said wheel drive shaft and be actuated by driving in rotation the drive shaft of the wheels when the motor input shaft is stopped or when the speed of rotation of the drive shaft of the wheels is greater than the speed of rotation of the drive wheel.

Most transmission boxes used in such wheeled machines comprise a clutch mechanism whose passage from the disengaged to the engaged position is controlled by means of an actuator, such as a fork, which controls the movement of the clutching members within the box. An example of such a transmission box including a clutching mechanism with an external actuator for said box is particularly described in the patent EP 0 782 820.

For simplification of construction and reduction of the control members, there have been developed so-called automatic clutches. An example of such a clutch is particularly described in the patent EP 1 198 981. In this case, it is the movement of a spring in the form of a split ring disposed coaxially to the drive shaft of the wheels, which plays the role of clutching member between a toothed wheel and a member secured in rotation to the drive shaft of the machine wheels. This solution is relatively complex to practice and does not give satisfaction in terms of reliability of the clutching and unclutching operations. Moreover, there has been noted rapid wear of the spring leading to malfunction of clutching.

As has been mentioned above, so that automatic clutching will operate, it should be true that the axially movable member be driven in movement in a first direction by a drive member, such as a powered toothed wheel, and in a second direction by the wheel drive shaft. Such is not the case with devices disclosed in U.S. Pat. No. 4,153,964 and U.S. Published Application 2003/155,204.

Thus, U.S. Pat. No. 4,153,964 discloses a member of the wheel type with a ratchet axially movable along the shaft by means of ramps 76 coacting with axles of the radial pin type 68, 66. This wheel, provided with ramps, is here maintained permanently in engagement with the shaft because in the course of its axial movement, it coacts either with the axle 69, or with the axle 68. It is thus each time the axis mounted on the guide shaft of the wheel which controls the axial movement of said wheel along this axle. Such a solution is however not transposable to an automatic clutch.

U.S. 2003/155,204 itself discloses a clutching device of the plate type constituted by an element of the plate type with notches coupled to a driven element and shown at 4 in the drawings, an element of the plate type with notches or crenalations shown at 6 in the figures and coupled to a driving element and, between said elements 4 and 6, an intermediate clutch plate shown at 50 in the figures.

This clutch plate 50 comprises, on one of its surfaces, crenalations adapted to coact with crenalations on the member 6 to permit driving in rotation said clutch plate whilst on its other surface it is provided with ratchet teeth adapted to engage with the driven element 4. Under the influence of its own weight, the element 50 comes into engagement by means of its teeth with the crenalations of the member 4 so as to transmit the movement of rotation of the member 6 to the member 4. If the member 4 is moved at a speed higher than the clutch plate 50, then the arrangement of the teeth and of the crenalations permits axial movement by the member 4 of the member 50. As a result, the member 50 is not movable axially so in a controlled manner in the two directions but only in a single direction. In the other direction, it is its own weight which makes it move axially. The member 6 thus does not control the axial movement of 50. Moreover, in such an operation, the fact that positioning the support shaft of said pieces in a horizontal position is impossible. Only vertical position of such a shaft is possible.

As a result, again, this document cannot be compared to a device of the automatic clutch type because here, the clutch plate is controlled in axial movement in only a single direction.

SUMMARY OF THE INVENTION

An object of the present invention is thus to provide a transmission box and a wheeled machine provided with such a transmission box, whose design permits guaranteeing reliability over time of the clutch mechanism.

Another object of the present invention is to provide a transmission box of the mentioned type whose design permits considerably reducing the number of pieces within said box.

To this end, the invention has for its object an improved transmission box for a wheeled machine, particularly of the walking type, of the type comprising, disposed at least partially within said box, a motor input shaft driving a drive wheel to actuate at least one drive shaft of at least one machine wheel, a clutch mechanism being disposed between the drive wheel and the drive shaft of the machine wheel or wheels, this clutch mechanism being actuated by driving in rotation the drive wheel and axial movement of at least one member on said wheels drive shaft and be actuable by driving in rotation the wheels drive shaft when the motor input shaft is stopped or when the speed of rotation of the drive shaft of the wheels is greater than the speed of rotation of the drive wheel, characterized in that the member movable axially on or along the wheels drive shaft carries at least one ramp coacting with a member secured in rotation with said shaft to permit in a clutching phase these securing in rotation between the ramp or ramps of the movable member and the member that is secured in rotation with said shaft, and thus the transmission of the movement of rotation of the movable member to the drive shaft of the wheels, and in the known clutching phase, the disconnection between the ramps of the movable member and the member secured in rotation to said shaft.

The member movable axially on or along the wheel drive shaft is controlled in axial movement in a first direction by driving in rotation of the drive wheel and in a second direction by the wheel drive shaft.

The use of ramps during clutching and unclutching phases permits guaranteeing reliability of the operations without risk of premature wear.

The invention also has for its object a wheeled machine, particularly on the walking type, such as a lawnmower, characterized in that said machine is provided with a transmission box of the mentioned type.

BRIEF DESCRIPTION OF THE DRAWINGS

The invention will be better understood from a reading of the description, according to examples of embodiment, with reference to the accompanying drawings, in which.

DETAILED DESCRIPTION OF THE DRAWINGS

Figure 1:
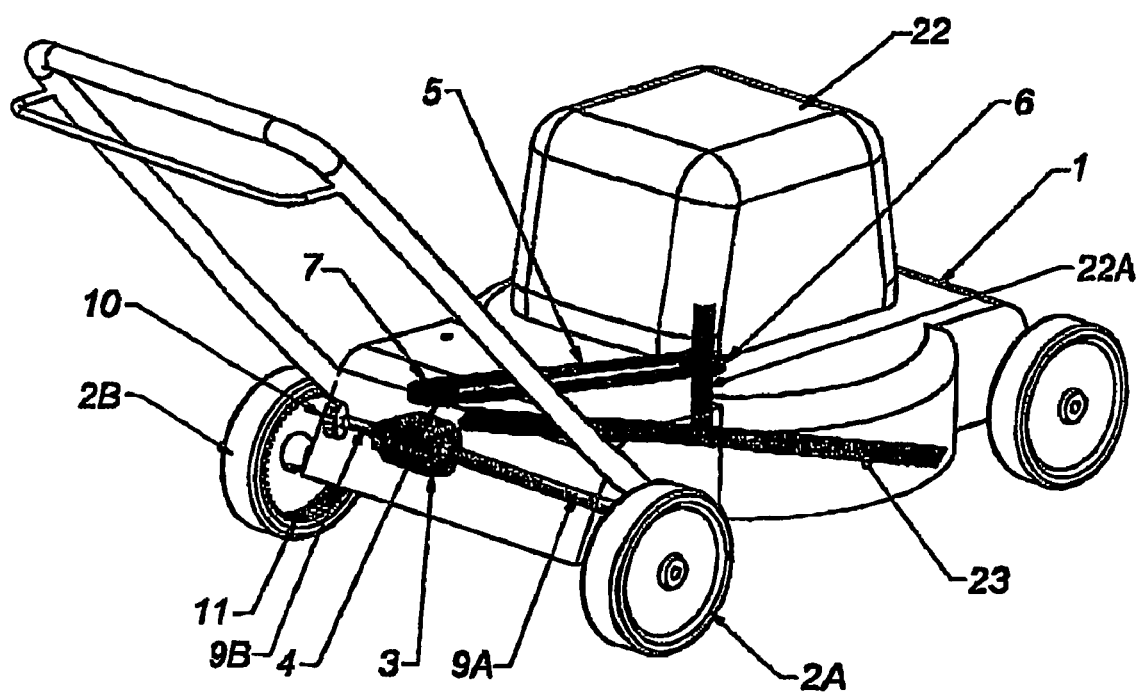
FIG. 1 is an assembly view of a wheeled machine provided with a transmission box according to the invention.

As mentioned above, the transmission box 3 according to the invention is more particularly adapted to be applied to wheeled machines 1, particularly of the walking type. FIG. 1 shows the application of such a transmission box to a lawnmower. This lawnmower comprises, in a manner known per se, a wheeled chassis. The rear wheels of this chassis are shown at 2A, 2B in the drawings. The machine is provided with a motor 22. The motor output shaft 22A carries on the one hand a cutting blade 23, on the other hand a drive pulley 6 connected by means of a belt 5 to a driven pulley 7. This driven pulley 7 is itself mounted on a motor input shaft 4 adapted to be disposed at least partially in the transmission box 3, according to the invention. This motor input shaft 4 drives in rotation a drive wheel 8, disposed within the box and positioned coaxially of a drive shaft 9 of the wheels 2A, 2B of the machine 1. This wheel 8 is adapted to actuate at least one drive shaft 9 of at least one machine wheel. In this arrangement, the motor input shaft 4 is positioned substantially orthogonally to the axis of the drive shaft of a wheel or wheels of the machine. A clutch mechanism 13 is disposed between the drive wheel and the drive shaft 9 of the wheels 2A, 2B of the machine. At the ends of the drive shafts of the wheels, projecting from the transmission box 3, is disposed in each instance a pinion 10 adapted to come in engagement with a pinion 11 carried by each wheel 2A, 2B of the machine. Obviously, other transmission means of the movement of the drive shaft 9 of the machine wheels 2A, 2B to the wheels can be provided without departing from the scope of the invention.

The clutch mechanism, disposed between drive wheel 8 and drive shaft 9 of wheels 2A, 2B of the machine 1, is actuated by the driving in rotation of the drive wheel 8 and axial movement controlled by said drive wheel 8 of a member 15, 15' on said drive shaft 9 of the wheels 2A, 2B. Thus, during its driving in rotation, the wheel 8 controls the axial movement of the member 15, 15' in a first direction. The clutch mechanism is deactuable by driving in rotation the drive shaft 9 of wheel 2A, 2B when the motor input shaft 4 is stopped or when the speed of rotation of the drive shaft 9 of wheel 2A, 2B is greater than the speed of rotation of the drive wheel 8.

In a manner characteristic of the invention, the member 15, 15' axially movable on the wheel drive shaft 9 and controlled in movement in a first direction by the drive wheel 8 carried by the ramps 17, 17', 14 coacting with a member 18, 19 secured in rotation to the shaft 9 to permit in a clutching phase the securement in rotation of the ramps 17, 17', 14 to each other of the movable member 15, 15' and the piece 18, 19 secured in rotation with said shaft 9 and accordingly the transmission of the movement of rotation of the member 15, 16' to the wheel drive shaft 9 and in the unclutched phase, the loosening between the ramps 14, 17, 17' of the movable member 15, 15' and of the piece 18, 19 secured in rotation with said shaft 9. In this unclutched phase, the drive shaft 9 of the wheels is free to turn in any direction.

On this basis, several embodiments of the invention can be envisaged.

Figure 8:
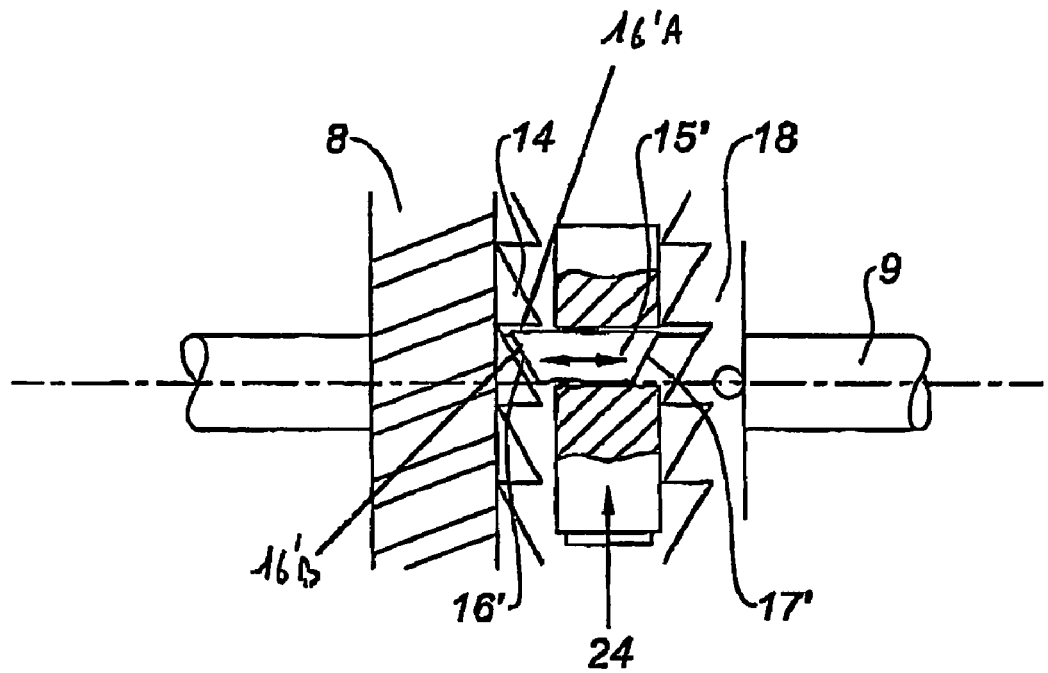
FIG. 8 is a cross-sectional view of another embodiment of transmission box according to the invention.
Figure 9:
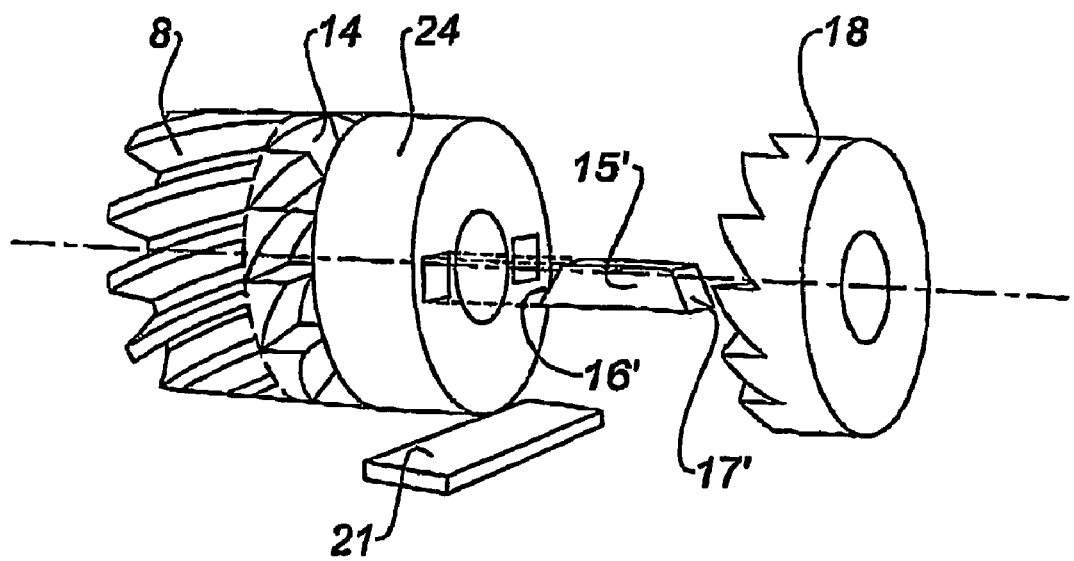
FIG. 9 is a perspective view, in the open condition of the box, of another embodiment of transmission box according to the invention.

According to a first embodiment of the invention, described in FIGS. 8 and 9, the axially movable member 15, 15' is a key 15' guided for movement within a bore in a plate 24 mounted on the drive shaft 9 for the wheels and disposed between drive wheel 8 and member 18 secured in rotation to the shaft 9, the longitudinal axis of said bore being substantially parallel to said drive shaft 9 of the wheels. This key 15' is provided with a side of ramps 16', adapted to coact with the ramps 14 of the drive wheel 8 to cause axial movement of said key 15' and on the other hand, of ramps 17' adapted to coact with the member 18 or 19 secured in rotation to the drive shaft 9 of the wheel so as to give rise to driving in rotation said shaft 9. Of course, the plate 24 can be provided with one or several axially movable members 15'.

However, for reasons of simplicity of the clutch mechanism 13, the design which will be described hereafter is preferred.

Figure 2:
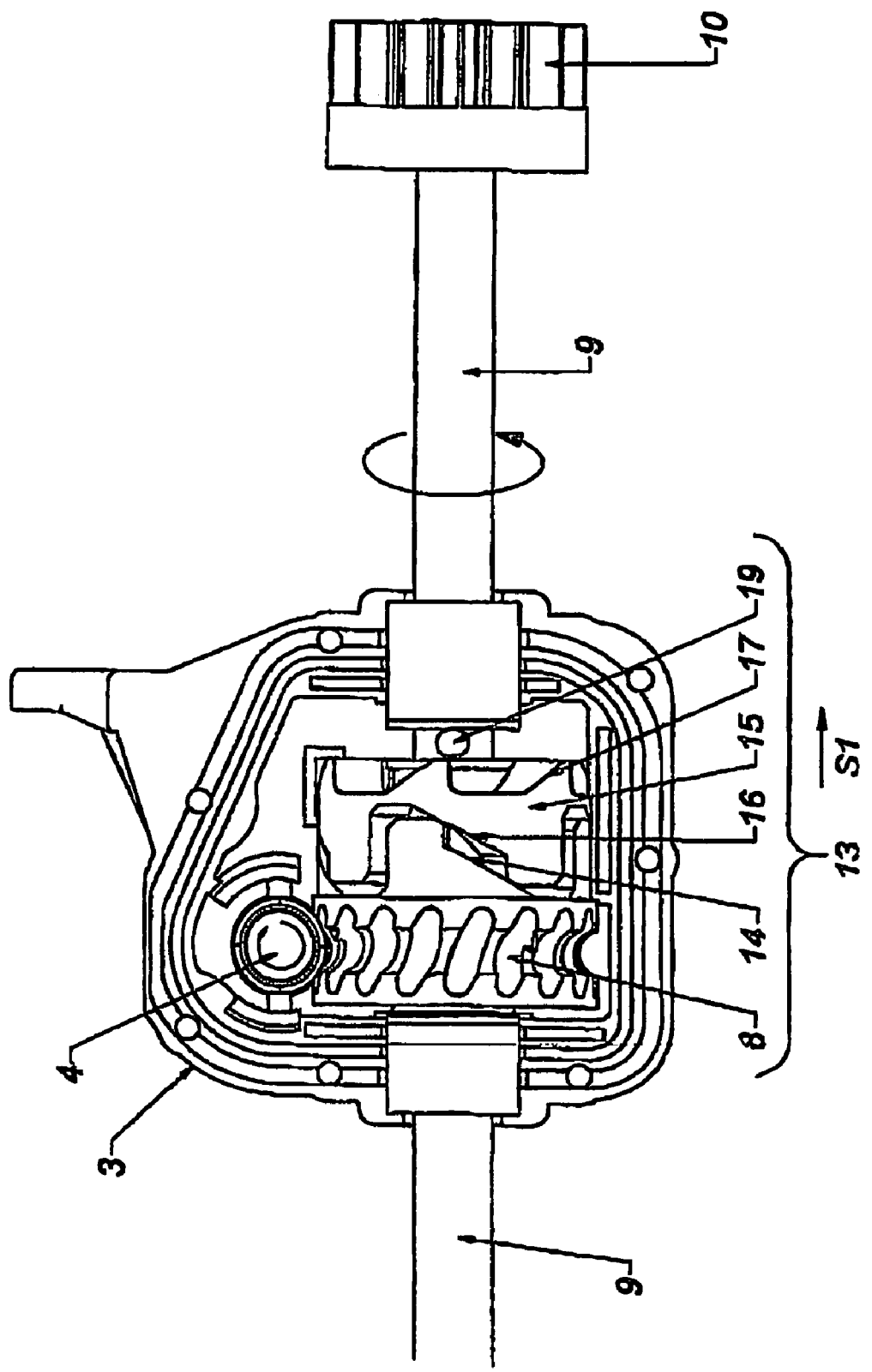
FIG. 2 shows in top plan view, in the open condition of the box, an embodiment of a transmission box according to the invention in unclutched or free wheel driving position of the shaft.
Figure 3:
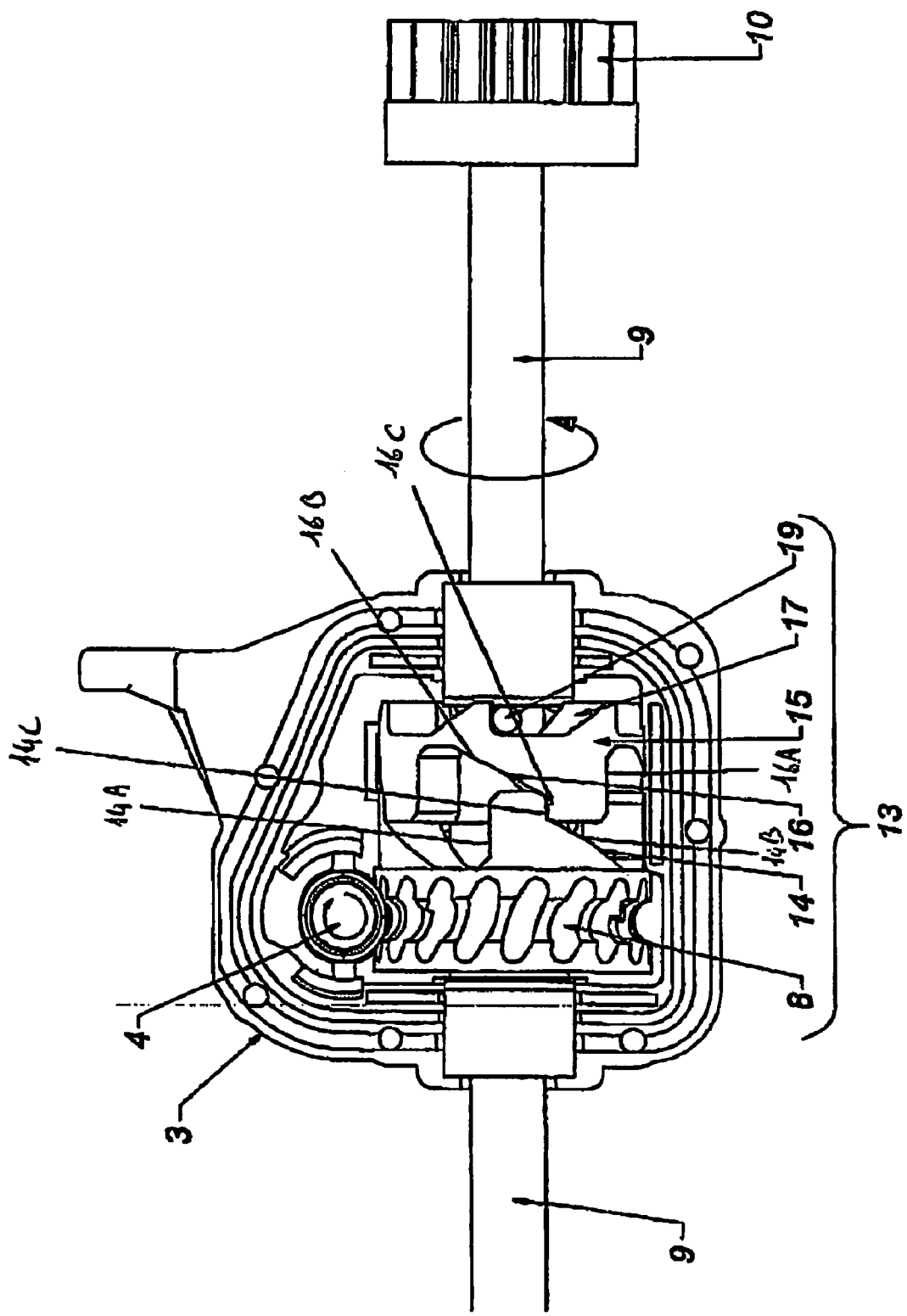
FIG. 3 is a top plan view of a box according to FIG. 2 in the engaged position of the shaft.
Figure 4:
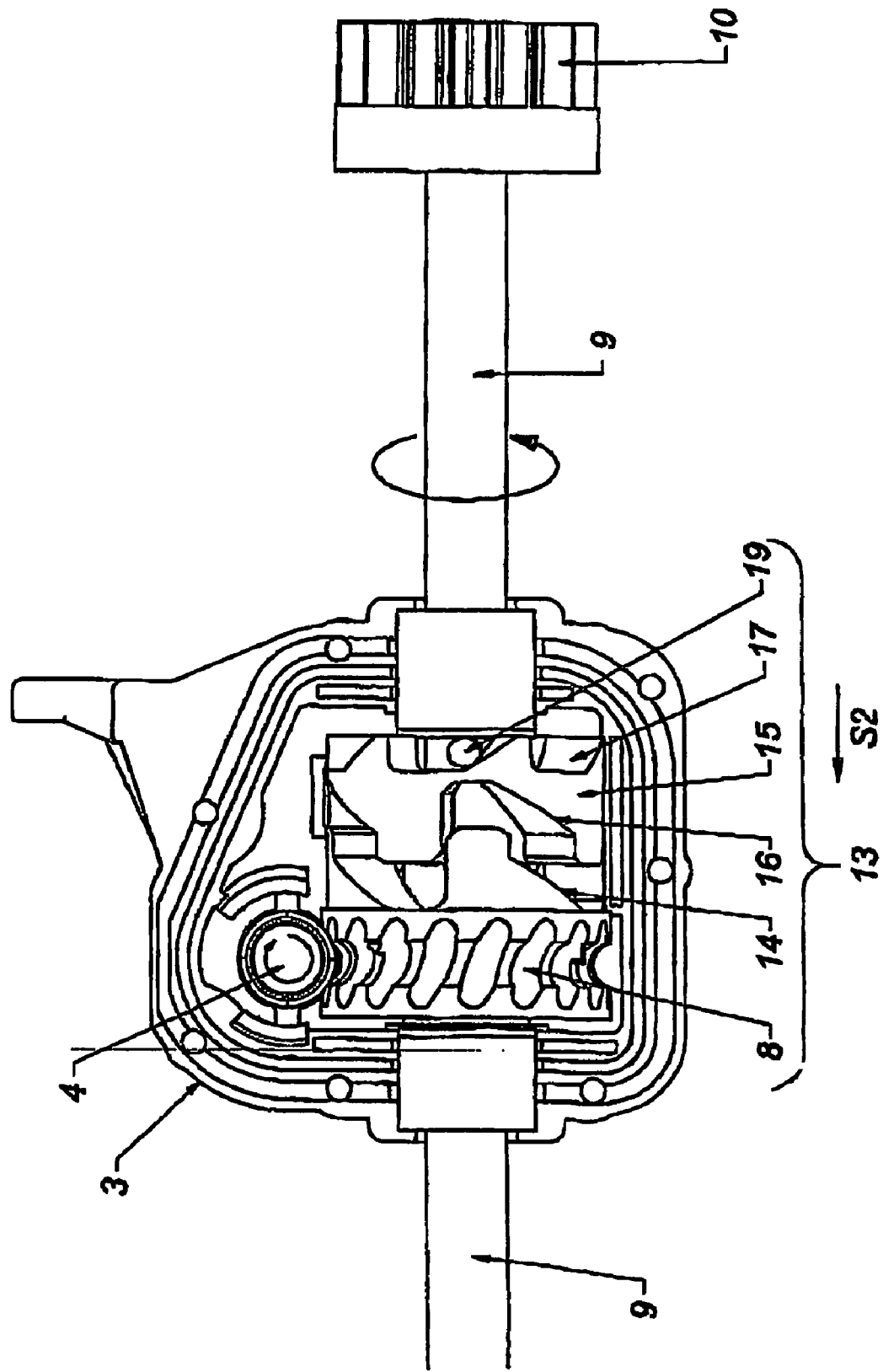
FIG. 4 is a top plan view of the box of FIGS. 2 and 3 in the unclutched phase, unclutching having not yet been completed.

In another embodiment of the invention, according to FIGS. 2 to 4, the member 15 movable axially on the drive shaft 9 of the wheels 2A, 2B is a clutch plate disposed between drive wheel 8 and member 18, 19 secured in rotation to the shaft. This clutch plate 15 is provided, on each of its surfaces, with ramps 16, 17. The piece secured in rotation to the drive shaft 9 for the wheels 2A, 2B is itself in the form of a pin 19 positioned radially of said shaft 9.

The operation of such a transmission box is as follows:

During driving in rotation of the input motor shaft 4 of said box, the toothed drive wheel 8 is driven in rotation. The ramps 16 on one surface of the plate 15, braked in rotation by means of a suitable brake 21, thus coact, during this clutching phase, with the ramps 14 of the drive wheel 8 for axial movement in a first direction of securement in rotation with the pin 19 carried by the drive shaft 9 of the wheels and secured in rotation with this latter. Thus, the coaction of the ramps 14 of the toothed wheel 8 and the ramps 16 of the clutch plate 15 gives rise to axial movement in the direction S1 in FIG. 2, of the clutch plate 15 up to a position in which the other surface of this clutch plate 15 comes into engagement with the pin 19 to permit the transmission of the movement of rotation of the clutch plate to the drive shaft 9 of the machine wheels. This coaction of the clutch plate 15 with the pin 19 takes place by means of ramps 17 carried by the clutch plate 15 coacting with the pin 19.

In this phase of operation, as described above, the drive wheel 8 and the axially movable member 15, 15' carry, on their facing surfaces, ramps 14, 16, 16' which coact, during the clutching phase, for axial movement of the member 15, 15' movable in a first direction of securement with the wheel drive shaft 9. These ramps 14, 16, 16' are constituted by at least one of the flanks of teeth or crenelations projecting from said surface.

Preferably, each tooth of the drive wheel 8 or of the axially movable member 15, 15' is an asymmetric tooth. Thus, each tooth of the drive wheel 8 or of the axially movable member 15, 15' comprises a flank 14A, 16A parallel to the axis of rotation of the wheel drive wheel 9 and an inclined flank 14B, 16B forming a ramp, adapted to give rise to relative axial movement of the drive wheel 8 and the axially movable member 15, 15'. The provision of these teeth, in the form of asymmetric teeth, permits the drive wheel 8 to avoid generating any axial movement of the movable member 15, 15' during rearward driving of the toothed wheel. Such a movement would be obtained particularly during reversal of the electrical connection of the motor. The shape of the teeth is thus fundamental to permit observing safety rules.

Moreover, the inclined flank 14B, 16B of the tooth forming a ramp of the drive wheel 8 or of the movable member 15, 15' is prolonged in the direction of the summit of the tooth by a portion 14C, 16C of the flank extending parallel to the axis of rotation of the wheel drive shaft 9. This portion 14C or 16C of the tooth in prolongation of the active portion of said tooth, which is to say which controls the axial movement of the movable member 15, 15', is the inverse of an inactive portion which causes no axial movement of the member 15, 15'. There is thus avoided the generation of too great a permanent axial force on the member 15, 15' at the risk of thus having to reinforce the assembly of the construction, and in particular the mechanical strength of the locks.

In the clutching phase, the ramps 17 and the pin 19 are thus positioned as shown in FIG. 3. During the unclutching phase, which arises for example by stopping the driving in rotation of the motor shaft 4 and accordingly the drive toothed wheel 8, the ramps 17 of the surface of the plate 15 opposite that which faces the drive toothed wheel 8 coact with the opposite arms of the pin 19 to give rise by axial movement in the opposite direction, which is to say opposite to S1 of the clutch plate 15, the free turning of the drive shaft 9 of the wheels 2A, 2B. Thus, it will be understood in FIG. 4 that the driving in rotation of the shaft 9, connected to the inertia of the machine during stopping of the drive shaft 4, gives rise to a driving movement of the pin which acts on the ramps 17 to give rise to axial movement of the clutching plate 15 in a direction S2, which is to say in the direction of the drive wheel 8 until occupying a position as shown in FIG. 3 such that the drive shaft 9 of the wheels can then freely continue to turn because it is entirely disconnected from the assembly formed by the clutch plate 15 and the drive wheel 8. The term automatic clutching is used in this case because the clutching is obtained by simple driving in rotation of the drive wheel 8 whilst the unclutching is obtained by driving in rotation of the drive shaft 9 of the wheels. The driving of the drive shaft 9 of the wheels naturally takes place during stopping of the driving in rotation of the drive shaft 4 because of the inertia of the machine which tends to give rise to supplemental advance of the machine, this advance being sufficient to give rise to unclutching of the clutch mechanism.

Figure 5:
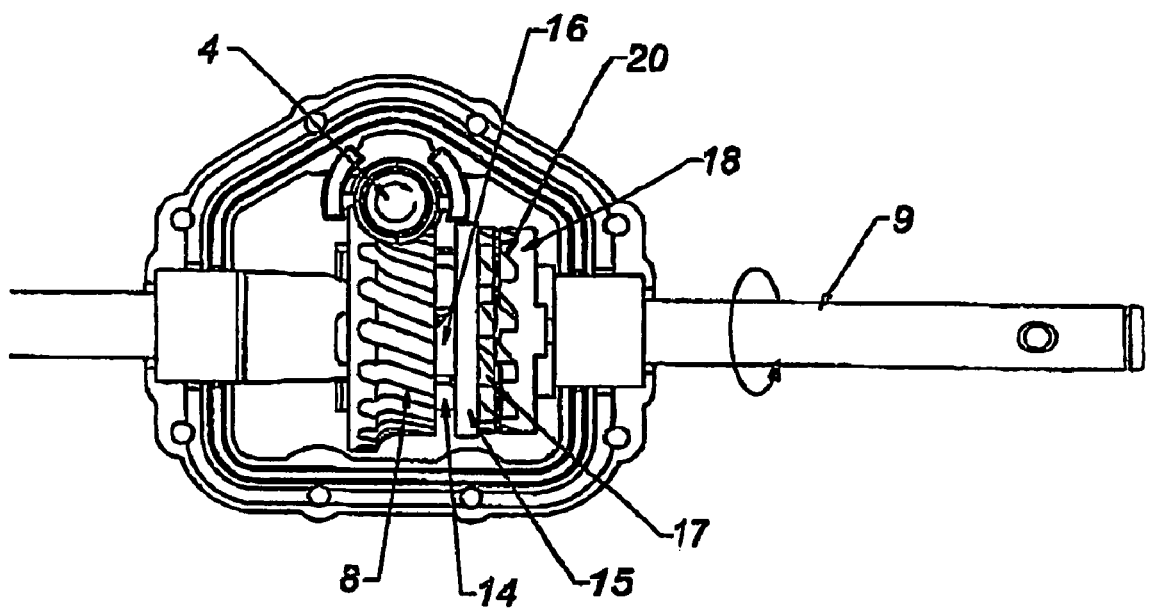
FIG. 5 is a top plan view, in the open condition of the box, of another embodiment of the transmission box according to the invention.

In another embodiment of the invention according to that shown in FIG. 5, the pin 19 is replaced by a wheel 18 provided on its surface facing the clutch plate 15 with ramps 20. This wheel 18 is of course secured in rotation to the drive shaft 9 of the wheels. In this case, the ramps 16 of one surface of the plate 15 then coact during the clutching phase with the ramps 14 of the drive wheel 8 for axial movement in a first direction of securement in rotation with the wheel 18, carried by the drive shaft 9 of the wheels 2A, 2B and fixed in rotation with this latter.

The ramps 17 on the other surface coact, during the phase of unclutching, with the ramps 20 of the wheel 18 carried by the wheel drive shaft and secured in rotation with this latter to give rise, by axial movement in a direction opposite the plate 15, to the free wheeling of the drive shaft of the wheels 2A, 2B.

Independently of the embodiment used, the member 15, 15' movable axially on the wheel drive shaft 9 is provided with a brake 21 acting on the angular speed of this member 15, 15' to facilitate or permit the unclutching and clutching phases. This brake 21 for example a friction brake can be constituted by a spring blade acting by friction on the section of the axially movable member 15, 15'.

In the illustrated examples, the motor input shaft 4 is an endless screw or cylindrical-conical pinion whose teeth coact with the teeth of toothed drive wheel 8. Of course, other embodiments of input shaft 4 could also be envisaged without departing from the scope of the invention, in a drive means in rotation for the drive wheel 8 being included within the scope of the invention.

Figure 6:
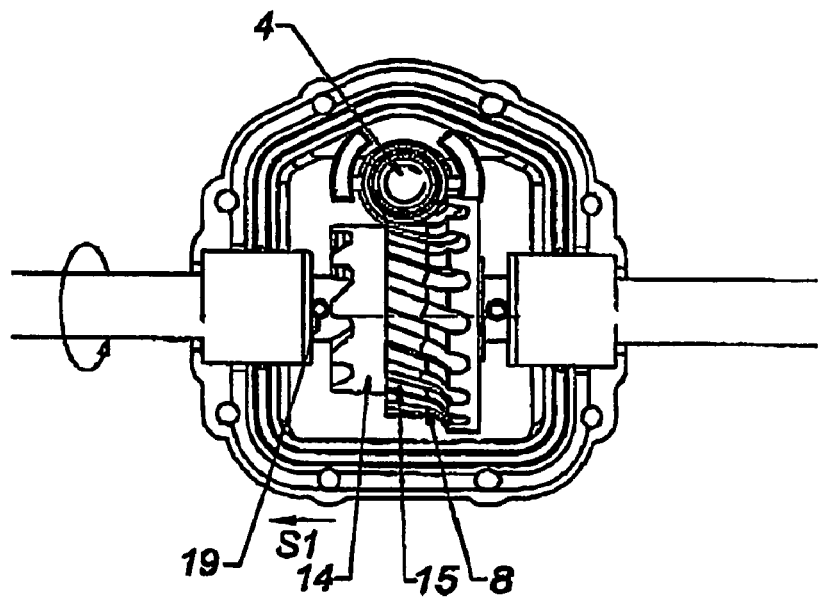
FIG. 6 is a top plan view, in the open condition of the box, of another embodiment of the transmission box according to the invention.
Figure 7:
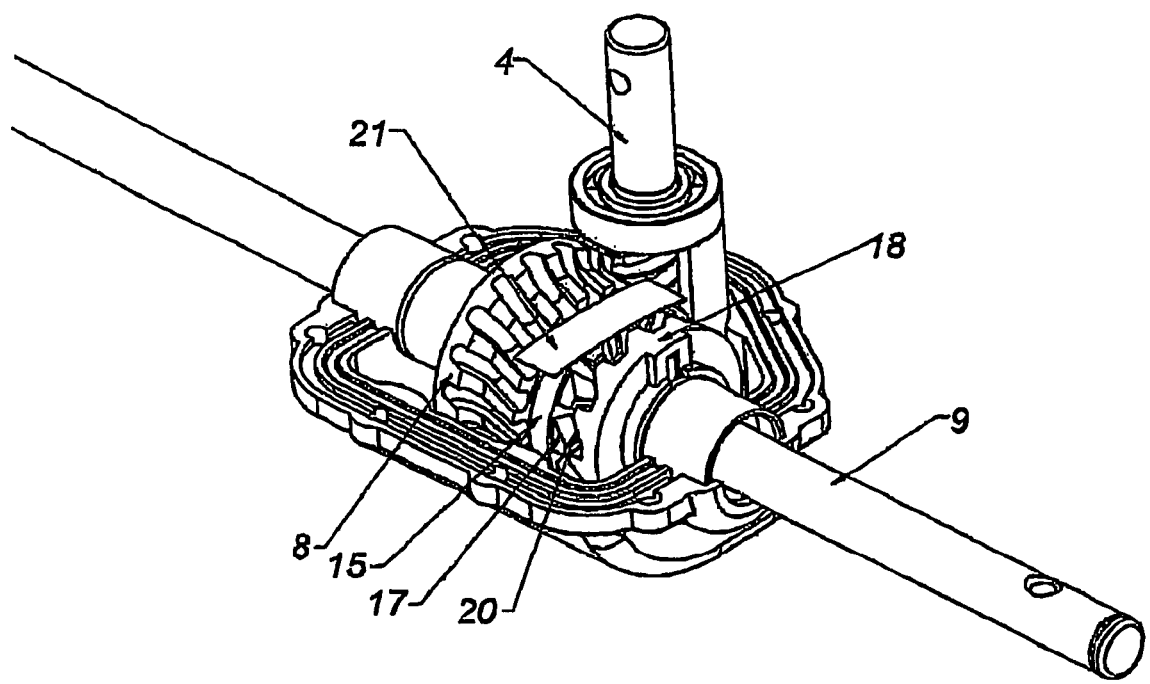
FIG. 7 is a perspective view, in the open condition of the box, of another embodiment of transmission box according to the invention.

In yet another embodiment of the invention, shown in FIG. 6, the member 15, 15', axially movable on the drive shaft 9 of the wheels 2A, 2B, is constituted by the toothed drive wheel movable axially on said shaft by means of a specific profile of teeth. This toothed wheel is, in a manner analogous to the clutch plate 15 which was described above, provided with ramps shown at 14 in the figures, these ramps being adapted to coact with the member 18 or 19 fixed in rotation to the drive shaft 9 of the wheels. Again, the member 18 or 19 fixed in rotation with said shaft 9 can be formed by a pin or by a wheel provided with ramps as has already been described above in the case of a clutch mechanism including a clutch plate. The ramps 14 of the toothed wheel fulfill in this case the same role and perform the same function as the ramps 17 of the clutch plate 15. It is thus not necessary further to describe the role of the ramps 14.

This construction is interesting in that it is no longer necessary to integrate between the toothed wheel and the drive shaft of the wheels a clutch plate, the ramps 14 carried by the toothed wheel and the profile of the teeth provided on the periphery of said wheel 8 being elements sufficient to ensure the function of the clutch mechanism. It will thus be noted, as shown in FIG. 6, that when the shaft 4 is driven in the direction shown in FIG. 6, the toothed wheel tends to move in the direction of arrow S1 shown in FIG. 6. This movement is solely due to the complementary profile of the teeth provided respectively on the motor input shaft 4 and the section of the toothed drive wheel 8. As a result, there is a simplification of the construction of the assembly. It will be seen that the member secured in rotation with the drive shaft 9 for the wheels can have a large number of shapes. Thus, as has been mentioned, it could be present in the form of a wheel 18 provided with ramps 20 adapted to coact with the ramps 17 of the clutch plate 15 or 14 of the toothed wheel 8 when it is the toothed drive wheel 8 which serves as the clutch plate, thereby playing the role of the axially movable member of the clutch mechanism. Analogously, the member secured in rotation with the drive shaft 9 for the wheels can be present in the form of a pin 19 whose opposite legs are adapted to coact with the ramps 17, 14 of the member 15, 15' movable axially on said shaft.

In the case in which the toothed wheel 8 serves as the axially movable member on the drive shaft 9 of the wheels, this latter will be provided with a brake acting on the angular speed of said wheel to facilitate or permit the clutching and unclutching phases. This brake 21 can be constituted by a simple leaf spring. It is thus necessary each time to facilitate and permit the clutching and unclutching phases of braking the axially movable member 15 to permit the sets of ramps to act.

The drive shaft of the wheels can itself be in the form of a single piece or in the form of two half shafts which are for example kinematically secured together in movement.

The transmission box, which contains the assembly of the elements, is itself a stationary box in the position of operation of the transmission. This box is generally formed by two half shells assembled on a joint plane, these half shells being connected by cementing and/or screwing.

The transmission box of the type described above has an extremely simple design by reason of its reduced number of pieces, rendering the risks of breakdown or malfunction much smaller than in the case of the prior art.

What is claimed is:

1. A transmission box (3) for a wheeled machine (1), comprising:
    disposed at least partially within said box (3), a motor input shaft (4) driving a drive wheel (8) to actuate at least one drive shaft (9) of at least one wheel (2A, 2B) of the machine (1); and
    a clutch mechanism (13) being disposed between the drive wheel (8) and the drive shaft (9), the clutch mechanism (13) being actuated by driving in rotation of the drive wheel (8) and axial movement of at least one member (15, 15') on said drive shaft (9) and deactuated by driving in rotation the drive shaft (9) when the input shaft (4) is stopped or when the speed of rotation of the drive shaft (9) is greater than a speed of rotation of the drive wheel (8),
    wherein the member (15, 15'), movable axially on or along the drive shaft (9), is a clutch plate (15, 15') disposed between the drive wheel (8) and a member (18, 19) secured in rotation with the drive shaft (9),
    wherein the clutch plate (15, 15') is provided, on each of its surfaces, with ramps (16, 17, 17'),
    wherein the ramps (16) on one surface of the clutch plate (15, 15') coact, during the clutching phase, with ramps (14) of the drive wheel (8), for axial movement of the clutch plate (15, 15') in a first direction of securement in rotation with the member (18, 19) carried by the drive shaft (9) and secured in rotation with the latter and, as a result, a transmission of the movement of rotation of the clutch plate (15, 15') to the drive shaft (9), said ramps (14, 16, 16') being constituted by at least one of flanks of teeth or crenalations projecting from facing surfaces of the drive wheel (8) and the clutch plate (15, 15'), each tooth of the drive wheel (8) or of the axially movable clutch plate (15, 15') being an asymmetric tooth, the ramps (17, 17') on the other surface of the clutch plate (15, 15') coacting during the unclutching phase with the member (18, 19) carried by the drive shaft (9) and secured in rotation with this latter to give rise, by axial movement in direction opposite said clutch plate (15, 15'), a disengagement between the ramp or ramps (17, 17') of the movable clutch plate (15, 15') and the member (18, 19) secured in rotation with said drive shaft (9), to a free wheeling of the drive shaft, and that the clutch plate (15, 15') movable axially on the drive shaft (9) of the wheels is provided with a friction brake (21) acting on an angular speed of said clutch plate (15, 15') to facilitate or permit phases of clutching and unclutching, the friction brake (21) being constituted by a spring blade acting by friction on a section of the axially movable clutch plate (15, 15').

2. The transmission box according to claim 1, wherein the member secured in rotation with the drive shaft (9) is a wheel (18) provided with ramps (20) adapted to coact with the ramp or ramps (17, 17', 14) of the axially movable clutch plate (15, 15').

3. The transmission box according to claim 1, wherein the member secured in rotation to the drive shaft (9) of the wheels (2A, 2B) is present in the form of a pin (19) whose opposite legs are adapted to coact with the ramps (17, 17', 14) of the member (15, 15') axially movable on said shaft.

4. The transmission box according to claim 1, wherein each tooth of the drive wheel (8) or of the axially movable clutch plate (15, 15') comprises a flank (14A, 16A, 16'A) parallel to the axis of rotation of the wheel drive shaft (9) and an inclined flank (14B, 16B, 16'B) forming a ramp adapted to give rise to relative axial movement of the drive wheel (8) and of the axially movable clutch plate (15, 15').

5. The transmission box according to claim 4, wherein the inclined flank (14B, 16B) of the ramp forming tooth is prolonged in the direction of the summit of the tooth by a flank portion (14C, 16C) extending parallel to the axis of rotation of the drive shaft (9) of the wheel drive shaft (9).

6. The transmission box according to claim 1, wherein the drive input shaft (14) is an endless screw or a cylindrical-conical pinion.

7. A wheeled machine (1) or a lawnmower, wherein said machine (1) is provided with a transmission box (3) according to claim 1.

8. The wheeled machine (1) or lawnmower according to claim 7, wherein the wheeled machine (1) is a walking type wheeled machine.

9. The transmission box according to claim 1, wherein the clutch mechanism (13) is an automatic clutch mechanism.

10. The transmission box according to claim 1, wherein the wheeled machine (1) is a walking type wheeled machine.

* * * * *

UNITED STATES PATENT AND TRADEMARK OFFICE
CERTIFICATE OF CORRECTION

| | | |
|---|---|---|
| PATENT NO. | : 7,665,589 B2 | Page 1 of 1 |
| APPLICATION NO. | : 11/432338 | |
| DATED | : February 23, 2010 | |
| INVENTOR(S) | : Robert Blanchard | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Fourth Day of January, 2011

David J. Kappos
*Director of the United States Patent and Trademark Office*